(12) United States Patent
Ökvist et al.

(10) Patent No.: US 11,952,088 B2
(45) Date of Patent: Apr. 9, 2024

(54) METHOD AND DEVICE FOR RESCUE MISSION ASSISTANCE

(71) Applicant: Telefonaktiebolaget LM Ericsson (publ), Stockholm (SE)

(72) Inventors: Peter Ökvist, Luleå (SE); Tommy Arngren, Södra Sunderbyn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 17/260,757

(22) PCT Filed: Jul. 16, 2018

(86) PCT No.: PCT/EP2018/069247
§ 371 (c)(1),
(2) Date: Jan. 15, 2021

(87) PCT Pub. No.: WO2020/015810
PCT Pub. Date: Jan. 23, 2020

(65) Prior Publication Data
US 2021/0276675 A1    Sep. 9, 2021

(51) Int. Cl.
*B63C 9/22*    (2006.01)
*B63C 9/01*    (2006.01)
*B64D 47/00*    (2006.01)
*B64U 101/57*    (2023.01)

(52) U.S. Cl.
CPC .................. *B63C 9/22* (2013.01); *B63C 9/01* (2013.01); *B64D 47/00* (2013.01); *B64U 2101/57* (2023.01); *B64U 2201/10* (2023.01)

(58) Field of Classification Search
CPC .. B63C 9/22; B63C 9/01; B64D 47/00; B64U 2101/57; B64U 2201/10; B64U 2201/56
See application file for complete search history.

(56) References Cited

U.S. PATENT DOCUMENTS 9,106,810 B1 *  8/2015  Hadsall, Sr. ......... G08B 21/086
9,809,307 B1    11/2017  Richardson
(Continued)

FOREIGN PATENT DOCUMENTS

CN    107719606 A    2/2018
FR     3054998 A1    2/2018

OTHER PUBLICATIONS

Machine translation of Dumartin et al. (FR Pub No. 3,054,998 A1) Pub date Feb. 16, 2018 (Year: 2018).*
(Continued)

*Primary Examiner* — Rodney A Bonnette
(74) *Attorney, Agent, or Firm* — Sage Patent Group (57) ABSTRACT

A method at a Unmanned Aerial Vehicle (UAV), and a UAV, adapted therefore, is adapted for enabling assisting in a rescue mission, where the method comprise: initiating a first localization of at least one body or object; initiating an analysis, for determining, at least partly based on the first localization of the at least one body or object, a need for activities, and initiating the determined activities, comprising applying floatable foam to an area on or in close proximity to the at least one body or object, while applying, to the floatable foam, a recognizable means capable of assisting in a second localization of the at least one body or object.

30 Claims, 6 Drawing Sheets

(56) References Cited

U.S. PATENT DOCUMENTS

| | | | |
|---|---|---|---|
| 2014/0111332 A1* | 4/2014 | Przybylko | G06Q 10/00 340/573.6 |
| 2016/0340006 A1 | 11/2016 | Tang | |
| 2018/0067493 A1* | 3/2018 | Pilskalns | G05D 1/0094 |
| 2018/0107210 A1* | 4/2018 | Harnett | G01S 15/96 |
| 2018/0194445 A1 | 7/2018 | Tang | |
| 2018/0356507 A1* | 12/2018 | Ichinose | B64C 1/36 |
| 2020/0265731 A1* | 8/2020 | Lev | G08G 5/0013 |

OTHER PUBLICATIONS

International Search Report and Written Opinion of the International Searching Authority, PCT/EP2018/069247, dated Apr. 3, 2019, 15 pages.

Yeoung, S.P., et al., International Journal of Mechanical Aerospace, Industrial, Mechatronic and Manufacturing Engineering, "A Review on Marine Search and Rescue Operations Using Unmanned Aerial Vehicles", Dec. 31, 2015, pp. 396-399, vol. 9, No. 2, XP055572400.

WARA-PS (Public Safety), https://wasp-sweden.org/research/research-arenas/wara-ps-public-safety, Jul. 20, 2018, 3 pages.

"Smart Survival at Sea," Yanko Design, https://www.yankodesign.com/2016/06/13/smart-survival-at-sea, Jul. 20, 2018, 5 pages.

Office Action, Chinese Patent Application No. 201880095551.7, dated Mar. 25, 2023, 5 pages.

Office Action dated Dec. 27, 2023 for Chinese Patent Application No. 201880095551.7, 17 pages (includes English translation).

\* cited by examiner

METHOD AND DEVICE FOR RESCUE MISSION ASSISTANCE

CROSS REFERENCE TO RELATED APPLICATIONS

This application is a 35 U.S.C. § 371 national stage application of PCT International Application No. PCT/EP2018/069247 filed on Jul. 16, 2018, the disclosure and content of which is incorporated by reference herein in its entirety.

TECHNICAL FIELD

A method and a device for assisting in a rescue mission, comprising providing floatable foam and recognizable means to a body or object.

BACKGROUND

Unmanned Aerial Vehicles (UAVs), are used in a wide variety of applications throughout society, such as e.g. for providing delivery services, for proving aerial photography services and participation in film making, execution of remote sensing tasks in areas such as e.g. agriculturing, civil engineering and city planning, and for providing support for public safety and rescue services. There are many different types of UAVs available on the market that can be remotely controlled, using WiFi or some proprietary radio technology. Such UAVs are capable of establishing radio communication, sensing data via data sensor, as well as performing autonomous operations. In addition, there are UAVs available on the market which are configured for analyzing data collected via data capturing means, such as e.g. data sensors and cameras. UAVs can also operate as relay stations between ground-based terminals and network base stations, in order to extend the operational area of a communication network.

When executing rescue missions over open water, it is much more difficult to locate and detect people in distress, compared to missions in ponds and close to a beach area. Given that it takes time to reach, localize, and identify people in distress, to provide floating support to people in distress, and that time is critical for a non-lethal outcome of a rescue or a Search and Rescue (SAR) mission, new methods for shortening the time to rescue people from open water is required. One example of a project, focusing on new industrial solutions applicable for the public safety are can be found at, http://wasp-sweden.org/demonstrators/wara-ps-public-safety/, which includes research on UAVs to be used in rescue missions.

Life saving equipment used today, such as e.g. lifebuoys and life jackets may be equipped with whistles, led lights or even electronic chips, designed for locating people in distress. A life vest, comprising an electronic locator is described haps://www.yankodesign.com/2016/06/13/smart-survival-at-sea/.

However, for persons that have not been able to put on a lifebuoy or life jacket, before having to enter water it is normally very difficult to acquire such floating aid once in water, especially in situations when there are no people available to assist the person in distress.

SUMMARY

It is an object of the present document to address, or at least to some extent alleviate, the problem described above.

Therefore a method for a UAV for assisting in rescue missions, specifically over open water, and a UAV, especially adapted for the mentioned method is suggested.

More specifically, according to one aspect, a method at a UAV is suggested, where the method comprise initiation of a first localization of at least one body or object, followed by an initiation of an analysis, for determining, at least partly based on the first localization of the at least one body or object, a need for activities, and an initiation of determined activities, comprising applying floatable foam to an area on, or in close proximity to, the at least one body or object, while applying, a recognizable means, capable of assisting in a second localization of the at least one body or object, to the floatable foam.

By applying the suggested method, a body or object can be provided with a combination of floatable foam and recognizable means, from a UAV, which, is capable of assisting a plurality of bodies or objects with both floatable aid after the bodies and objects and/or means have been found a first time, wherein the recognizable means are capable of assisting in localization a second time.

According to another aspect, a UAV, capable of assisting in a rescue mission, as suggested above, is suggested. More specifically, the UAV comprise processing circuitry and a memory, storing instructions, which, when executed by the processing circuitry, cause the UAV to initiate a first localization of at least one body or object, after which an analysis, for determining, at least partly based on the localization of the at least one body or object, a need for activities, is initiated. The determined activities are then initiated, wherein the initiation of activities comprise applying floatable foam to an area on, or in close proximity of, the at least one body or object, while applying, recognizable means, capable of assisting in a second localization of the at least one body or object, to the floatable foam.

According to yet another aspect, a UAV for assisting in a rescue mission is suggested, where the UAV comprise: a localization unit for initiating a first localization of at least one body or object; an analyzing unit for initiating an analysis, for determining a need of activities, at least partly based on the localization of the at least one body or object, and an initiating unit for initiating the determined activities, comprising applying, by a first releasing unit, floatable foam to an area on or in close proximity to the at least one body or object, while applying, to the floatable foam, by a second releasing unit (620b), recognizable means, capable of assisting in a second localization of the at least one body or object.

According to another aspect, a computer program is suggested, where the computer program comprise computer readable instructions, which when run on a computer causes the computer to execute a method as described above.

According to yet another aspect, a computer program product is suggested, which product comprises a computer program as described above.

According to another aspect, a system, comprising a UAV and an active, recognizable device, is suggested, where the system comprise: a capturing unit for initiating a first localization of at least one body or object; an analyzing unit for initiating an analysis, for determining a need for activities, at least partly based on the localization of the at least one body or object, and an initiating unit for initiating, based on the determination, activities, comprising applying, via a first releasing unit floatable foam to an area on or in close proximity of the at least one body or object, while applying, via a second releasing unit, to the floatable foam, the active, recognizable device, capable of assisting in a second localization of the at least one body or object.

BRIEF DESCRIPTION OF DRAWINGS

Embodiments will now be described in more detail in relation to the accompanying drawings, in which.

DETAILED DESCRIPTION

Briefly described, a method for using a flying device, referred to as an Unmanned Aerial Vehicle (UAV), or a drone, in a rescue mission is provided, where the UAV is capable participating in a rescue mission over open water, with the capability of providing floating aid together with assistance for simplifying localization. More specifically, this is achieved by applying floatable foam that is in the form of a floatable buoyance foam, from hereinafter referred to as floatable foam, to one or more human beings and/or animals, from hereinafter referred to as bodies, and/or objects, such as e.g. floatable cargo, where the foam is applied on or in close vicinity of one or more bodies and/or objects. By introducing the suggested method and UAV, more people and cargo can be saved with less effort required. Due to its lightweight properties, use of floatable foam, carried in liquid form before release into air, will also provide floating aid for more people and cargo, compared to if a corresponding amount of life vests or other types of floating aid were to be carried and provided to the scene of a rescue mission.

The floatable foam to be used can be any type of known sprayable foam, that, when released from a container where the foam is kept under pressure, transforms from a liquid to a solid form, and provide insulating and floatable properties. The foam can be of a known type, typically used for insulation purposes. In order to obtain further improved buoyance properties a larger amount of air can be applied into the foam than what is normally required when used for insulation purposes only, when the foam is released from the container. The mentioned foam is typically made of polyurethane or a composition having corresponding buoyancy properties and possibly also insulating properties. Preferably a foam also having relatively short time to quench is selected for the mentioned purpose.

In addition to releasing floatable foam to a site where there is a need for releasing floatable aid, the foam is also provided with means which can simplify localization of the foam, and the one or more bodies and/or objects to which the foam has been provided or attached. From hereinafter such means is referred to as recognizable means. The recognizable means is adapted so that, later it can assist a device, typically other than the mentioned UAV, a vehicle, such as e.g. a helicopter, submarine or vessel, such as e.g. a coast guard vessel, to localize the recognizable means. The UAV may also be capable of acquiring data from the recognizable means and/or exchanging sensor data and/or computer readable instructions between the UAV and the recognizable means, in case the recognizable means is provided as an active, recognizable device, as will be described in further detail below. The UAV may also be capable of storing and/or analysing acquired and/or exchanged data. Thereby acquired data may either be analysed by or with assistance from the UAV, or it can be stored for later manual or automatic analysis, so that the outcome of such an analysis can be used for providing assistance during the continuing phase of the initiated rescue mission.

Since the required time for localizing people and/or animal in the water the second time may be decisive for whether the people and animal will be alive or not once the rescue mission arrives, or whether cargo can be collected before it is destroyed by the water, it is essential that assistance for localizing the recognizing means is as efficient and accurate as possible. Known foam, as described above is releasable in a form where it is capable of fixing the recognizable means to the foam, as well as to the body or object to which the foam is attached. Yet another advantage with combining the use of floatable foam and a recognizable means is that the foam, in addition to insulating properties also will provide protection against physical impact of the recognizable means. Due to at least the latter advantage, it is to be understood that, in case active, recognizable means is used, also floatable foam with insufficient floating capacity for keeping a body floating may still be very useful in a rescue mission, as described herein, e.g. due to the adhesive properties in combination with the ability to protect the active, recognizable device from physical damage may be sufficient e.g. for attaching and maintaining active, recognizable means to a body. The latter scenario may be acceptable e.g. in a situation where people in need already are equipped with a life vest or other buoyancy aid, but still are in need of active equipment for assisting in future localization.

In a typical scenario, foam will be applied as repeated layers on or around one or more bodies or objects, e.g. by the UAV circulating around a body or body part repeated number of times, thereby allowing also the amount of protection against physical impact to be controllable.

To sum up, the UAV described herein will be capable of providing floatable foam to a body or object, of attaching an recognizable means, which may be either passive, active, or a combination of both, to the floatable foam, and may also participate in a data exchange between the UAV and an active, recognizable device, where the latter procedure may have a purpose of acquiring more data, representative for the rescue mission, of providing data, which may include instructions, when activating an active, recognizable device in a suitable way, according to the circumstances.

Although the embodiments presented herein are referring to assistance over open water, it is to be understood that the suggested solution may also be applicable in a scenario where no buoyancy aid is required, but only attachment of an active recognizable device to a body is sufficient, i.e. an adhesive foam is required, possibly in combination with foam that provides protection against physical impact of recognizable means, when provided as a recognizable, active device.

The floatable foam may be provided on, around or in close vicinity of a respective body or objects, or group thereof. Extruding, floatable foam can be applied from a lightweight container, by controlling means of the UAV, via a suitable, controllable nipple, typically constructed so that air, giving the foam improved buoyance properties. The floatable foam can be arranged in loose or free form. Alternatively, the floatable foam can be released into a suitable, dedicated container, such as e.g. a thin, releasable rubber cover, inflatable into a predefined shape.

Figure 1A:
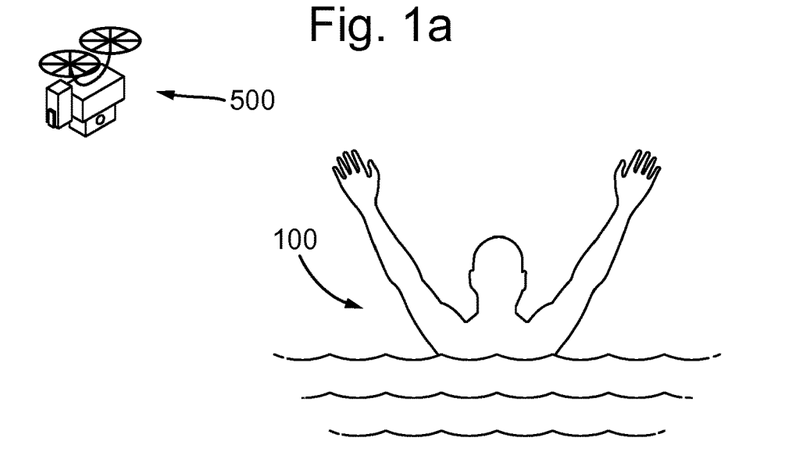
FIG. 1a is an illustration of a person in need, who has been discovered by a UAV.

FIG. 1a is illustrating a scenario where a person in need 100 has been recognized and localized by a UAV 500, adapted as described herein. Once the person in need 100 has been localized, the UAV 500 will make use of captured data, and may also initiate capturing of additional data, for determining if release of floatable foam and recognizable means is required for the person in need 100, e.g. based on the outcome of image processing.

Figure 1B:
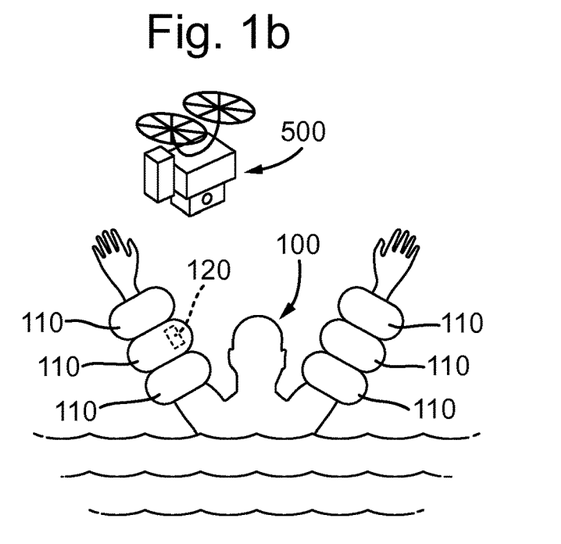
FIG. 1b is an illustration of a discovered person in need, on which floatable foam has been attached by a UAV, according to one embodiment.

FIG. 1b is illustrating how the UAV 500 has determined that floatable foam and recognizable means is required for the person in need 100. Acquired data has been analysed for determining how to best apply floatable foam 110 to the arms of a person in need 100, and recognizable means, here in the form of an active, recognizable device 120, has been embedded into the floatable foam 110 by the UAV 500. In the present scenario the floating foam 110 has been applied around the arms of the person in need 100, allowing the floating aid to sit tight to the body or object.

Figure 1C:
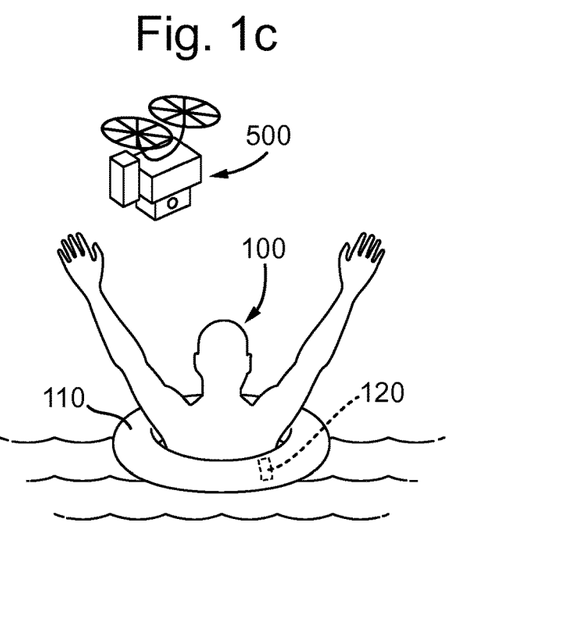
FIG. 1c is an illustration of a discovered person in need, to which floatable foam has been provided by a UAV, according to one embodiment.

FIG. 1c is illustrating an alternative scenario where the UAV 500 has selected an alternative way of applying floatable foam 110 to the person in need 100. In the scenario of FIG. 1c the person in need 100 is circumvented with floatable foam 110, comprising an active, recognizable device 120 embedded into the foam. The latter approach may also be the preferred approach if providing one set of floatable foam to a group of persons in need. It is to be understood that the UAV 500 may floatable apply a plurality of alternative approaches when it comes to the form of the floatable foam that is being released, such that e.g. floatable foam is provided in the form of a straight line of floatable next to a line of people drifting in the water.

The UAV can be referred to as a device, executing a first instance of a rescue mission at sea, capable of providing floating aid and recognizable means, whereas a device, vehicle or vessel which finally completes the rescue mission can be referred to as a device, vessel of vehicle, executing a second instance of the rescue mission, when bodies and cargo can finally be evacuated from the water. In a typical scenario, the first instance is executed by an autonomous UAV, where no, or minimal, human interaction is needed, or very likely not even available, whereas the second instance typically involves human individuals, such as e.g. rescue personal, or personal of a commercial cargo ship, who can make use of the assistance that the recognizable means can provide, when bodies and/or objects that have previously been assisted at the first instance are localized a second time. An advantage with applying both instances, one at a time, is that an autonomous UAV will be able to reach a site much faster than the personal of the second instance, thereby increasing the potential of saving lives and cargo or goods.

Consequently, the suggested method enables localization of bodies and/or objects, provided with floatable aid and recognizable means in a quicker and more efficient way, since a relatively large volume of floatable foam can be carried by the UAV, compared to if conventional floatable aid, such as e.g. life vests or lifebuoys were to be provided by a UAV to e.g. a group people or cargo, drifting around on the sea surface. Furthermore, the combination of floatable foam and recognizable means also provide for a more robust and reliable operation of the recognizable means, thereby increasing the likeliness of re-localization of bodies and objects drifting on e.g. a waste ocean. In addition to the information that can be captured from an active, recognizable device at the instance of localization, data captured, stored and possibly also analysed at the instance of release of floatable foam and recognizable means, or at a later occasion, can further assist in simplifying rescue, e.g. due to that the area of search can be selected and limited with improved accuracy.

The recognizable means may, according to one embodiment, be passive means, such as e.g. fluorescent paint, or micro metallic flakes, which may later be recognized visually or electronically. According to another embodiment, the recognizable means is instead provided as some kind of active means, in the form of an active, recognizable device, such as e.g. a device capable of emitting LED (Light Emission Diode) light, acting as a stroboscope, a device having transponder functionality, such as e.g. a SART (Search And Rescue Transponder) a PLB (Personal Location Beacon), or an EPIRB (Emergency Personal Indication Radio Beacon).

An active, recognizable device, is typically provided as a waterproof container, provided with conventional processor circuitry or electronics which can be activated by the UAV on or after being embedded into floatable foam, as well as a memory for holding computer readable instructions, and communication means for enabling communication with the UAV. The active, recognizable device may, in addition to being able to receive data from the UAV, be configured to emit more or less informative information representative of the situation when the mentioned recognizable means is initially applied to the foam. Alternatively, it may be configured to emit information relevant for upcoming movement patterns, such as e.g. estimated drift from the occasion of releasing of the foam.

The latter scenario may include collection of sensor data, such as e.g. one or more of: data indicative of underwater currents, speed and direction of wind and wave height, or various types of meteorological data, from one or more sensors, applied on the active, recognizable device. Relevant data may alternatively be collected by sensors of the UAV, the recognizable device or by a combination of both. Data collected by the active, recognizable device can be transmitted to the UAV in a data exchange procedure, initiated by the active, recognizable device or the UAV, and relevant data, now available to the UAV, can be analysed by the UAV, or, in case the UAV is able to connect to an available communication network, collected data can be transmitted to analysing functionality via the communication network, after which the result of the analysis can be provided to the active, recognizable device, as data to be emitted by the active, recognizable device on a continuous basis, or with suitable intervals.

Alternatively, collected analysed or un-analysed data, or a combination of both, can be stored and kept at the UAV for later use, e.g. for directing a rescue mission to an area where bodies or objects are most likely to be found.

The described first stage, which is typically terminated when the UAV leaves the emergency scene, may also comprise a data exchange of instructions between the UAV and an active, recognizable device, where, e.g. based on data analysis, completed by the UAV, the UAV may activate the active, recognizable device, i.e. initiate emission of data and instruct the active, recognizable device what data to emit and how to emit the data, such as e.g. at which intervals to emit. A number of different approaches on how to emit and what data to emit may be applied, depending on the circumstances. According to one embodiment, emission of a specific message may be delayed a certain time, or limited to specific time intervals, e.g. for saving battery.

At the second stage of the described rescue mission, starting at the instance of detection of the one or more bodies and/or objects a second time, the recognizable means may help rescue personal and/or electronic equipment, capable of identifying such passive or active recognizable means, to localize the one or more bodies and/or objects. At such an occasion, localization may be based only on recognized emitted data, indicative of the situation when the foam and recognizable means was released, or the emitted data may also comprise data indicative of data collected and analysed also some time instance after the release, but before the UAV left the one or more bodies and/or objects.

The UAV is configured as a controllable or autonomous UAV, which may be stationed e.g. on a boat or on any type of sea-going or flying vehicle or vessel, for quick, automatic or manual activation, in case of an emergency at sea, or it may be located at shore, from where it can be launched, e.g. based on an alarm of an emergency at sea, or due to a manual activation. How to trigger activation of the UAV or how to perform the autonomous search of a search area is out of the scope of this document, but the UAV may typically be provided with means, capable of searching and identifying floatable bodies or objects. From hereinafter such means will be referred to as capturing means, capable of capturing visual and/or audio data, which, after processing or analysis can be used for identifying and localizing one or more bodies and/or objects.

Capturing means is typically a camera, such as e.g. a warm sensitive camera, capable of selectively identifying bodies at sea, or a video camera, capable of sensing waving of human beings, while a microphone may be provided for capturing and interpreting speech or cries from human beings, as human beings expressing a need of a rescue. Various data sensors can provide additional input, which may be used for simplifying analysis of the situation and activities to be initiated.

Figure 2:
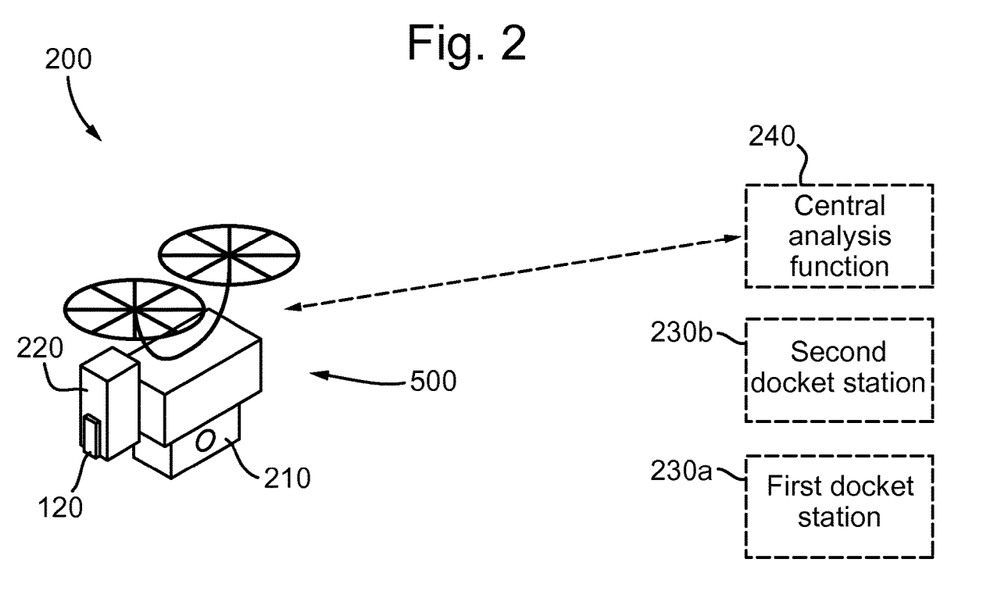
FIG. 2 is a system overview, illustrating a UAV, capable of finding a body or object and of providing floatable aid to a found body or object.

In addition to one or more capturing means, the UAV is provided with processing or analysing means which is capable of interpreting input, provided from the recognizing means, possibly in combination with data from data sensors of the UAV, the recognizable means, or both, so that a decision on how to arrange the floatable foam over or adjacent to bodies or objects can be executed in an efficient way. Data captured by recognizing means may include one or more of: captured picture data, captured speech and captured sensor data, such as e.g. estimation of distance to a body or object, which data can be interpreted by applying any of image recognition, speech recognition, evaluation of sensor data alone, or in a combination thereof A system 200, capable of operating as suggested herein, can be arranged as is illustrated in FIG. 2, where a UAV 500 is equipped with one or more capturing means 210, here in the form of a camera, a floatable foam releasing means 220, comprising, or connected to a foam container, containing floatable foam, and recognizable means, here illustrated as an active recognizable device 120, provided so that it easily can be released from the UAV 500 and attached, and incorporated into released, floatable foam. Since an active, recognizable device 120, configured according to any embodiment disclosed herein, can be configured in a very small and light weighted form, a UAV 500 can easily be configured to carry a number of recognizable devices 120 (not shown), which can be released one by one, each time a certain amount of floatable foam is released. The system 200, typically also comprise a first docking station 230*a*, from which the UAV 500 is initially launched, and may also comprise a second docking station 230*b*, to which the UAV 500 is destined to fly, after having completed the first part of the described rescue mission and which provides network access to the UAV 500. According to one alternative embodiment, the UAV 500 is configured or controlled to fly to and dock at a location where it has access to a communication network, either directly via the docking station, or via an access network, within coverage of any of the docking stations 230*a*,230*b*. In both alternatives, the UAV 500 is capable of providing stored data, representative of the rescue mission, to a rescue centre (not shown) or any type of receiving entity, capable of receiving, interpreting and making use of the provided data, for the purpose of completing the rescue mission. According to yet another alternative, or in combination with any of the previous alternatives, the first docking station 230*a* is configured to allow the UAV 500 to return to it for automatic replacing or reloading of foam containers and/or active, recognizable devices 120. Thereby, even a sinking vessel, containing a first docking station 230*a* with reloading facilities can be maintained in use also after people have been forced to leave the vessel, thereby increasing the amount of floatable foam that can be released before the vessel is below water surface. Typically the first docking station 230*a* is capable of, or connected to, means for triggering initiation of the described rescue mission, either on a manual basis or automatically, based on an alarm.

In case the UAV 500 lacks some or all of the required analysis functionality, such functionality may be instead executed by a central analysis function 240, to which the UAV 500 has connectivity. Alternatively, the UAV 500 may use a central analysis functionality 240 when the UAV 500 it has access to it, while it is using its own analysis functionality at any other time, e.g. in order to save battery. The central analysis function 240 may either be accessible via any type of wireless communication, or by the UAV 500 docking with a docking station, such as e.g. the second docking station 230*b*, if connected to the central analysis function 240.

As has already been implied above, the mentioned, autonomous UAV 500 will be pre-configured to execute certain event-triggered activities after an alarm has been initiated, manually or automatically, some of which activities will be exemplified below:

Initiate search for body or object in the water circumventing the vessel on which the UAV is stationed, by initiating a search scheme and activating one or more recognizing means, and optionally also one or more sensors of the UAV.

Initiate analysis of data captured by recognizing means, possibly in combination with input from one or more sensors, for determining if there is a need for releasing floatable foam and recognizable means.

In case it has been determined that there is a need for floatable foam and recognizable means—initiate analysis of captured data for determining a preferred strategy for applying floatable foam and recognizable means.

After a preferred strategy for applying floatable foam and recognizable means has been determined—initiate a process for applying floatable foam and recognizable means.

After having applied floatable foam and recognizable means, initiate one or more of: capturing sensor data from one or more sensors of the UAV, in case the recognizable means comprise an active recognizable device, activate the recognizable device and instruct the recognizable device to perform one or more tasks and performing data exchange between the recognizable device and the UAV.

After, or parallel to, receiving data from sensors of the UAV and/or from a recognizable device, initiate analysis of the acquired data, storing the result of the analysis, and, optionally, initiating one or more of: capturing further data, instructing recognizable device to perform one or more tasks based on the result of the analysis and initiate further analysis of acquired data.

After having completed release of foam and recognizable device and activation of recognizable device, initiate localization of other body or object.

When out of at least one of floatable foam and recognizable devices—initiate flight to docking station on vessel for reloading of floatable foam and/or recognizable devices.

When in need of analysing capacity—initiate flight to location indicated as providing access to central analysis function and initiate analysis process. If required, initiate flight back to rescue scene when analysis has been completed.

After having completed data capturing and processing of captured data—initiate flight to any of a pre-defined docking station or an area providing expected network coverage.

After having docked—connect to rescue centre or other predefined end point for delivery of captured, stored, and possibly also analysed data.

A method to be executed by a UAV as described above, will now be described in further details, with reference to FIG. 3a.

According to a first step 300, the UAV is initiating a localization of at least one body or object. This is done by using one or more capturing means, such as e.g. a heat-sensitive camera, when searching an area where it has received an indication of at least one body or object for which floatable aid is needed. The mentioned localization procedure is executed by interpretation and analysis of input from the capturing means, applied by the UAV by applying analysing functionality. In case the UAV is equipped with also a microphone, input from the microphone may be used for recognizing and analysing speech of a person in need of assistance. Speech recognition may e.g. assist the UAV in making more efficient prioritizations on how to apply floating foam and recognizable means. Alternatively, the UAV may also be equipped with a loudspeaker or visual means, which can be used for setting up a dialogue between the UAV and a person in need, in order to be able to collect and consider more information, essential for the present situation, which can be useful for determining how to apply the floatable foam, and possibly also for what information to emit by recognizable means, in case an active, recognizable device is applied. Such a dialogue may also be applied for instructing a person, or a group of persons in need on how to best behave and handle the situation, until rescue staff arrives.

In another step 305, a further analysis for determining whether or not a need for activities, including releasing and applying floatable foam with recognizable means, are needed, is executed. The mentioned further analysis is, at least partly, based on the already achieved localization. Further activities, which may be triggered at this stage, may include e.g. activation of data sensors on the UAV and/or an active, recognizable device, activation of a wireless connection between the UAV and the active, recognizable device, so that sensor data and/or instructions can be transmitted between the two entities, before the UAV leaves the scene for other tasks, such as e.g. assisting another body, object or group of bodies and/or objects.

Data captured by the capturing means can, according to one embodiment, be applied in a determining process, capable of applying Machine Learning (ML). More specifically, the captured context, which may include e.g. image recognition, movement patterns, word recognition and/or analysis of data captured by data sensors, can be interpreted as calling for a need for floatable aid, here in the form of floatable foam, and as a demand for a certain amount and form of floatable foam. A combination of data captured from a plurality of bodies and/or objects may be interpreted as calling for grouping together bodies and/or objects into suitable groups, e.g. based on the geographical distribution of bodies and/or objects on the water surface, where each group is provided with a suitable amount of floatable foam, applied according to a certain pattern. By applying ML on captured data, the recognizable means, if applied as an active recognizable device, can be activated and adapted accordingly. The mentioned analysis may also be based on additional input, such as e.g. one or more of an identity or category of a body or object, such as e.g. a recognizable label of the clothes or an electronically emitted, and detectable identity or category, which information can be used to simplify determination of needed activities. Typically the amount of floatable foam to be applied by the UAV may depend on one or more of the number of bodies and/or objects in need of support, estimated weight, relative position on the water surface and distance to shore and/or rescue personal. Picture analysis or image recognition, may also be applied for determining which of persons in distress that already appear to wear a life vest or any other type of floatable device, thereby determining e.g. that only recognizable means need to be applied to a person in need. Given a limited amount of foam, the amount and form of foam to be released at each instant may need to be optimized in order to minimize the per-body/object/group overhead. Also considerations, such as e.g. water temperature, air temperature, wind, type of waves, water conditions, such as e.g. pond, lake or ocean or calm or rough sea may be considered, for such optimizations. As a consequence, there will typically be trade-offs when determining whether to provide foam on an individual or on a per group basis.

Apart from using ML for determining how to best apply floatable foam, ML may also be used for how to best activate, or configure, the recognizable means, including e.g. how to collect and exchange data and which emission intervals to apply, once the active, recognizable means has been released and activated by the UAV.

In yet another step 310, the determined one or more activities, including at least applying of floatable foam to at least one body or object and applying the determined type of recognizable means to the foam, are initiated in appropriate order, so that the recognizable means is configured to operate as required, based on the analysis made in the previous step. The analysis of step 305 typically comprised, estimating the amount and/or form of floatable foam that is required for a body, object or group thereof, but may also comprise determination of need for additional data capturing and exchange of data and/or instructions. In the latter scenario, step 310 comprises release of floatable foam, according to the analysis.

The method described above is typically repeated until all bodies and objects requiring floatable aid have been handled accordingly and the UAV can initiate a flight to a docking station or to an area where it can get network access.

Figure 3A:
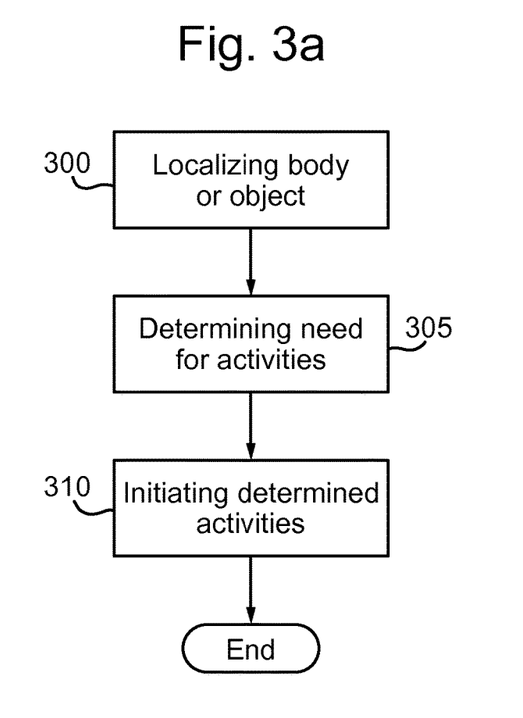
FIG. 3a is a flow chart, illustrating a method for assisting a body or object with floatable aid.
Figure 3B:
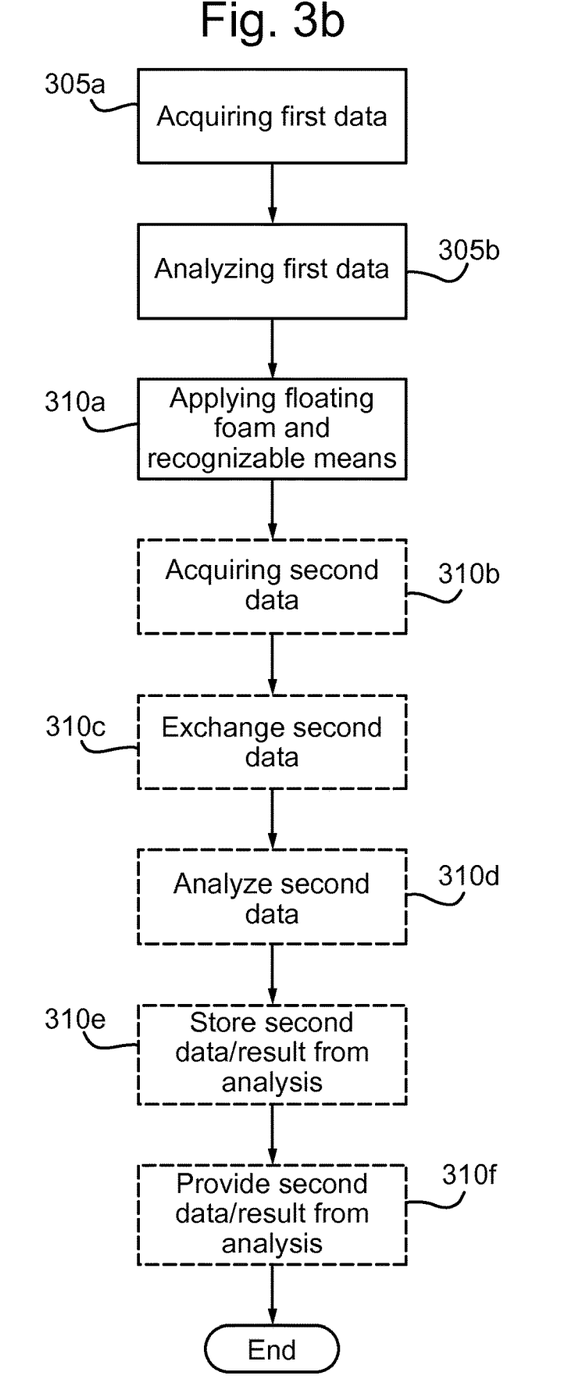
FIG. 3b is another flow chart, illustrating some steps of the method according to FIG. 3a in further detail.

FIG. 3b is illustrating steps 305 and 310 of FIG. 3a in further detail. Step 305a of FIG. 3b describes how need for activities is determined by acquiring data, here referred to as first data, by applying available capturing means, whereas the acquired first data is being analysed in a second step 305b, wherein the analysis will result in determination of whether or not there is a need for any activities. The result of the analysis will typically not only be that floatable foam and recognizable means are needed, but also in what form floatable foam will be provided and how the recognizable means will be activated, or configured. Alternatively, the activation of the recognizable means, in case of using an active, recognizable device, may require further activities to be initiated and completed, before an activation of the device can be considered as completed.

Once it has been determined that activities are indeed needed, required activities need to be initiated. As indicated with step 310a, floatable foam and recognizable means is always applied, as indicated with step 310a. It is to be understood that the described method may end at this stage, i.e. after the floatable foam and recognizable means has been applied, in case passive recognizable means is applied.

However, in a typical scenario, involving an active, recognizable device, further data exchange, possibly in combination with relevant data analysis, storage and possibly also delivery of the result of the analysis, may simplify for execution of upcoming steps of the rescue mission even further.

As indicated with optional step 310b, another activity may be to acquire further data, here indicated as second data. Such data may be acquired from data sensors of the UAV itself, requested and received from data sensors of an active, recognizable device, in a data exchange process, as indicated with another optional step 310c, or a combination of both may be required. In case step 310b and/or step 310c are executed, further data analysis will be needed, as indicated with another optional step 310d, and according to yet another optional step 310e, data resulting from the analysis of step 310d, may be stored at the UAV for later delivery e.g. to a docking station or to a central analysis function, as indicated with optional step 310f. It is to be understood that optional steps 310b-310f may be repeated one or more times, depending on how much data that is to be collected and analysed and how much data that is required before an activation of an active, recognizable device can be completed.

A typical scenario of a first part of a rescue mission, according to one embodiment where a person is in distress, will now be described in further detail, with reference to the signalling scheme of FIG. 4. As a pre-requisite, it is to be understood that an alarm, or any other manual or automatic trigger, has triggered a UAV, having capabilities as described herein, to search for a person in need or distress.

Figure 4:
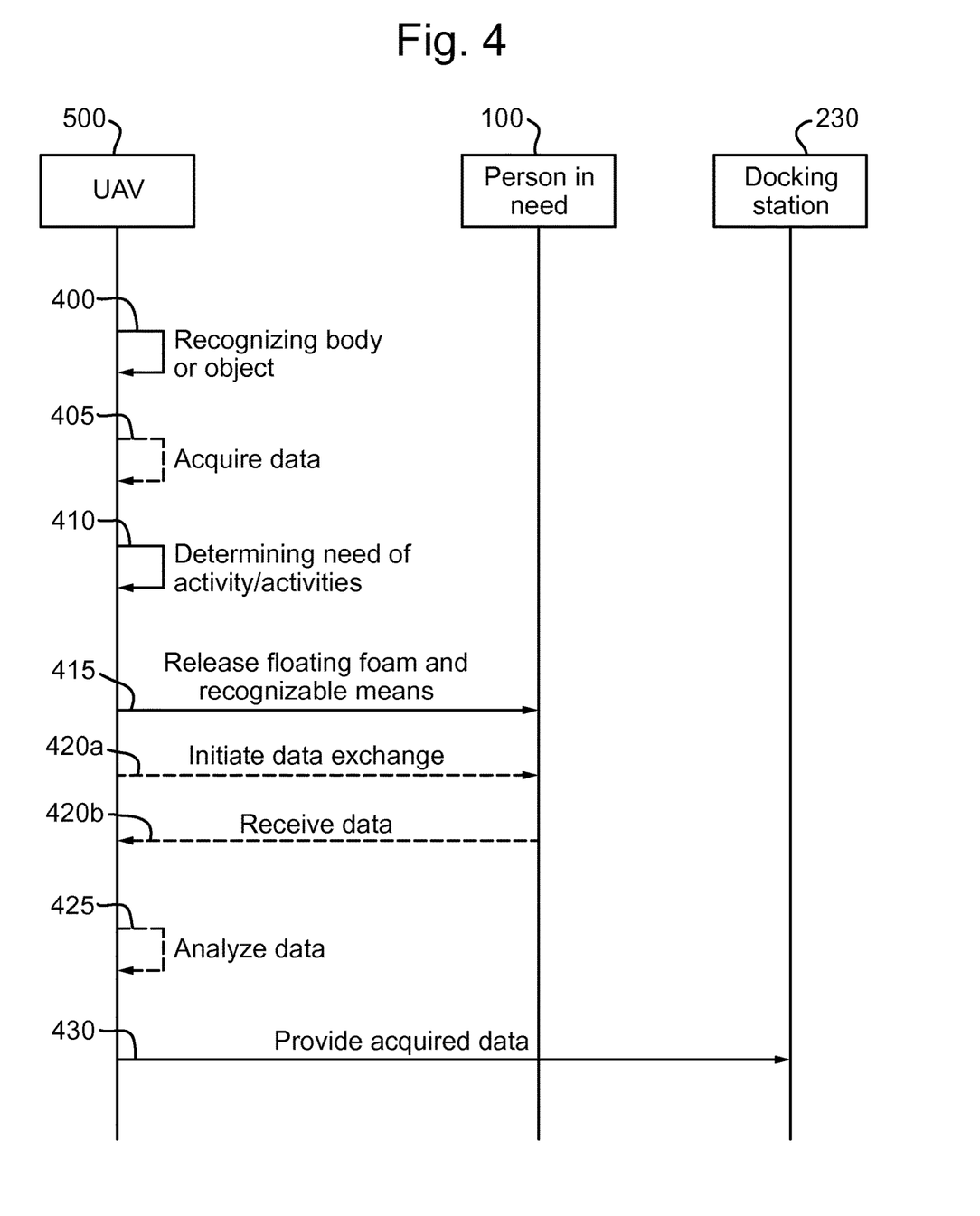
FIG. 4 is a signalling scheme illustrating a typical scenario where a UAV is finding and assisting a person in need.

In a first step 400 of FIG. 4, UAV 500 is recognizing a person in need 100, with the help of available capturing means. Based on an analysis of captured data, the UAV 500 is capable of determining a need of certain activities or actions, as indicated with another step 410, where it is determined that the person in need 100 is at least in need of floatable foam, provided with recognizable means. Prior to the determining at step 410, including an analysis, further data required for the analysis may be acquired from data sensors of the UAV 500, as indicated with optional step 405. Following step 410, floating foam and recognizable means, here exemplified by an active, recognizable device (not shown), are released, and the active, recognizable device is activated, according to the analysis, as indicated with another step 415. Once the floating foam and the active recognizable device have been released, further sensor data can be acquired by the UAV, from the active recognizable device, as indicated with step 420a, and 420b, where data is requested and received. In the latter scenario, the activation of the active, recognizable device is not completed until all necessary data has been exchanged accordingly. The latter data exchange may e.g. be executed by setting up a short range connection between UAV 500 and the active, recognizable means 120, by applying a known short range communication protocol, such as e.g. Bluetooth, WiFi, D2D or Zigbee. Step 415, possibly in combination with steps 420a and 420b, also includes an activation of the active, recognizable device. Activation is to be construed as initiating a transfer from passive to active mode of the active, recognizable device, where acquired data can be used for adapting the functionality of the active, recognizable device accordingly.

As already mentioned, although not shown in FIG. 4, further data may also be acquired from data sensors of the UAV 500. The sensor data acquired at this stage may e.g. comprise meteorological data, indicative of the rescue situation. In another optional step 425, acquired data may be analysed e.g. in order to predict the drift of the floating foam and the active, recognizable device, whereas in another step 430, acquired data and/or data that has been analysed, based on acquire data, is provided to an entity which has network connectivity, here represented by a docking station 230.

Any of steps 415 to 430 may be repeated until sufficient data has been acquired and analysed. By way of example, the UAV 500 may e.g. follow an active, recognizable device for a certain amount of time, e.g. by predicting the drift of the active, recognizable device, thereby enabling e.g. a more reliable prediction of the drift of the active, recognizable device.

How to apply the floatable foam is based on the result from the initial analysis of the present situation and the determined need at the site. Depending on the circumstances, the floatable foam may be provided to individual bodies and/or objects, to groups of bodies and/or objects, or as a combination thereof, based on a captured data. Typically each body/object or group of bodies/objects, will be provided with a respective recognizable means, but, e.g. in case of fewer recognizable means than bodies/objects in need, recognizable means may be provided e.g. every third time floatable foam is released. The suggested exchange of data may also comprise transmission of data from the UAV, such as e.g. a hash value or a code, which can later be interpreted to represent e.g. one or more of a certain amount of people and a location. Data acquired from the UAV or an active, recognizable device may comprise e.g. date, time of day, position when floatable foam is applied, estimated type of object or category of body for which floatable foam has been applied, such as e.g. adult, child, toddler, animal or pet, suitcase, container, number of objects or bodies carried by a piece of floatable foam, estimated health status, such as e.g. alive, injured or unclear. Such data may be acquired either by data capturing via one or more data sensors, or via a communication interface, i.e. a combination of presentation and capturing means, such as e.g. a loudspeaker and microphone, which, in combination with an instructing means and the analysing means can execute a dialogue with a person in distress. In a typical scenario, data received by the UAV is also stored at the UAV for later forwarding via a communication network, but in case of network access at the event of rescuing, forwarding of data can instead be executed instantly.

A UAV, capable of executing a method, such as the one described herein and configured according to one embodiment will now be described in further detail with reference to FIG. 5a.

Figure 5A:
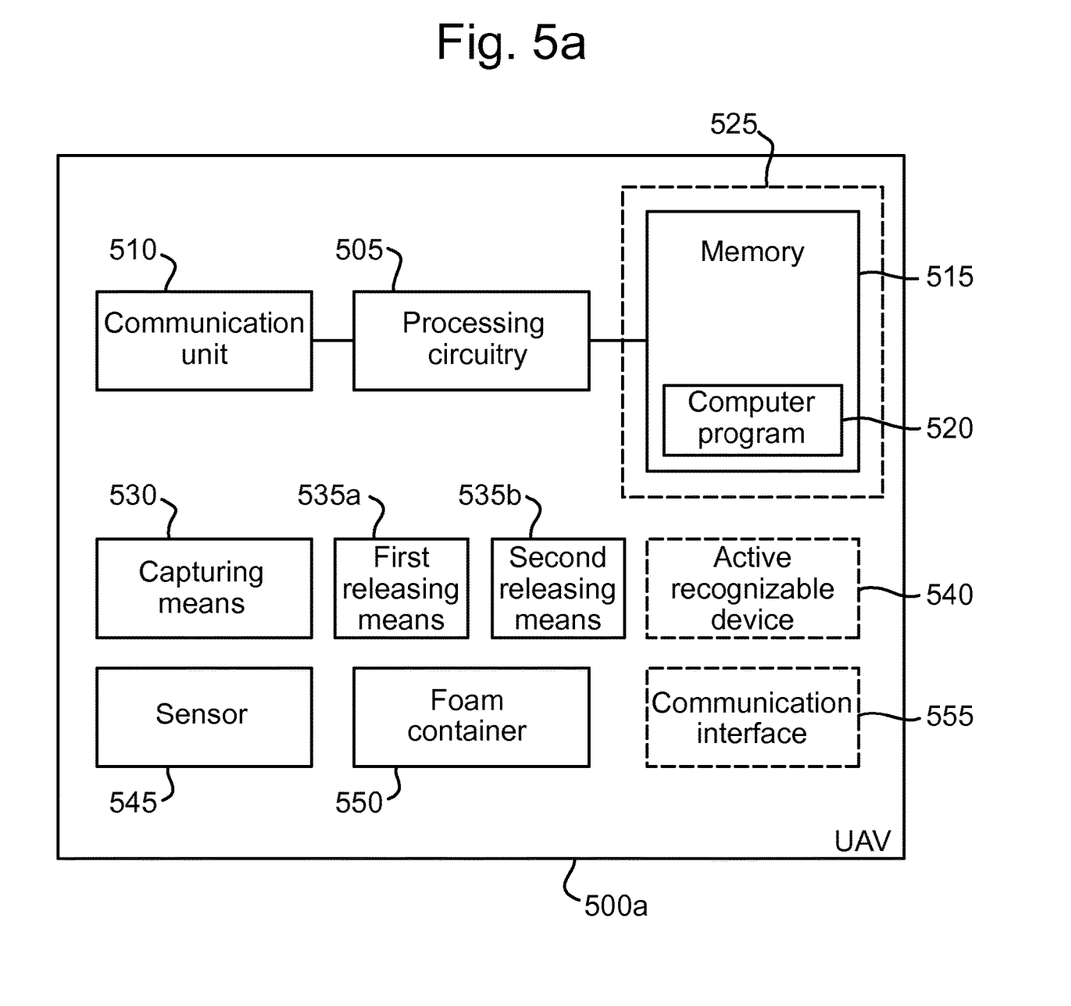
FIG. 5a is a block scheme, illustrating a UAV according to one embodiment.

FIG. 5a is illustrating a UAV 500a, suitable for assisting in a rescue mission, as described herein, wherein the UAV 500a comprise processing circuitry 505 and a memory 515, storing a computer program, comprising computer readable instructions 520. When executed by the processing circuitry 505, the computer readable instructions 520 cause the UAV 500a to execute a process as described above with reference to FIGS. 3a and 3b. The processing circuitry 505 is provided using any combination of one or more of a suitable central processing unit (CPU), an Application Specific Integrated Circuit (ASIC), a multiprocessor, a microcontroller, a digital signal processor (DSP), and/or application specific integrated circuitry.

The UAV 500a can be caused to initiate a first localization of at least one body or object, based on data input from available localization means 530. Once at least one body or object has been localized, the UAV 500a is caused to initiate an analysis, for determining, at least partly based on the outcome of the localization of the at least one body or object, a need for certain activities. The analysis may, in addition to the outcome of the localization, also be based on sensor data, provided from one or more data sensors 545 of the UAV 500a. The mentioned analysis may also be based on audible input from a person in need if the UAV 500a is also provided with a communication interface 555, comprising e.g. one or more of a microphone for capturing speech from the person in need, a display for showing instructions and/or questions visually to the person in need and/or a loudspeaker for providing instructions and/or questions in audible form.

The UAV 500a is then caused to initiate the determined activities, where the determined activities comprise at least applying of floatable foam, by activating a first releasing means 535a, initiating release of floatable foam from a foam container 550, according to a determined amount and form, to an area on or in close proximity of the at least one body or object, while applying recognizable means to the floatable foam, by activating a second releasing means 535b, where the second releasing means 535b may be configured to apply passive, recognizing means, e.g. by spraying fluorescent text or code on the floatable foam, or active, recognizable means, wherein the second releasing means is configured to release an active recognizable device 540, while the first releasing means 535a is releasing floatable foam, so that the active, recognizable device 540 is embedded into the foam. In case of applying an active, recognizable device 540, the mentioned instructions 520 also comprise instructions which cause the UAV 500a to active the active, recognizable device, meaning that it causes the active, recognizable device 540 to undergo a transition from passive to active mode, after which the active, recognizable device 540 is capable of starting to emit data according to a pre-defined pattern. More specifically, such instructions will cause the UAV 500a to activate emitting functionality such as e.g. one or more of stroboscopic, Light-emitting diode (LED) functionality, radio communication and transponder functionality.

Furthermore the computer readable instructions 520 comprise instructions which, during the analysis, causes the UAV 500a to evaluate the collected data in an analysing process, and to determine, based on the evaluation, that the floatable foam and the recognizable means are needed for the at least one body or object. The computer readable instructions 520, comprise instructions causing the UAV 500a to determine that floatable foam and recognizable means is applied for one single body or object or for a group of bodies and/or objects. Furthermore, computer readable instructions 520 may cause the UAV 500a to determine a specific amount of floatable foam and a suitable form of the floatable foam, based on the outcome of the suggested analysis. More specifically, the computer readable instructions 520 may cause the UAV 500a to determine suitable amount and form of the floating form, at least partly based on acquired data, where the acquired data may e.g. indicate one or more of: an identity or category of at least one body or object, a geographical distribution of a plurality of bodies and/or objects, together forming a group of bodies and/or objects; a movement pattern of the movement of the at least one body or object; meteorological data, indicative of the meteorological status of an area in which the at least one body or object is/are located.

The computer readable instructions 520 may, according to one embodiment also comprise instructions, which causes the UAV 500a to acquire additional data, either from one of its own sensors 545, from sensors of the active, recognizable device 540, or as a combination of both, where the data is consolidated so that the activation of the active, recognizable device 540 is executed in an optimized way, including a configuration of the functionality of the active, recognizable device 540. For this purpose the computer readable instructions 520 may comprise instructions, which causes the UAV 500A to collect data for determining at least one of: an identity or category of the specific body or object or group of bodies and/or objects, for which the activities have been initiated; a physical status of the specific body or group of bodies, for which the activities have been initiated; the number of bodies and/or objects within a group of bodies and/or objects, for which activities have been initiated, and a meteorological status when the activities have been initiated. The consolidated data may be stored in memory 515, or a separate memory (not shown) of the UAV 500a. The memory can be any combination of read and write memory (RWM) and read only memory (ROM). The memory typically also comprises persistent storage, which, for example, can be any single one or combination of magnetic memory, optical memory, solid state memory or even remotely mounted memory.

For the purpose of acquiring data from an active, recognizable device 540, after it has been released from the UAV 500a, the computer readable instructions 520, comprise, according to one embodiment, instructions instructing the UAV 500a to initiate transmission of data between the UAV 500a and the released, active, recognizable device 540, via a communication unit 510, typically by applying a suitable short-range communication protocol.

In a typical scenario, a UAV 500a, engaged in a rescue mission does not have any radio connectivity, i.e. capability to connect to any radio communication network. Therefore, the computer readable instructions 520, may also, according to one embodiment, comprise instructions capable of causing the UAV 500a to navigate towards a location where the UAV 500a is experiencing radio connectivity, and to provide at least part of the acquired data, possibly including processed data, via the available radio connectivity, e.g. via a 3G, 4G or 5G connection, via communication unit 510, in case that unit is configured to provide both long range and short range connectivity, or a separate communication unit (not shown).

Data analysis mentioned herein is typically executed by combining available data in order to optimize applying of floatable foam, but may also be combined in order to be able to predict e.g. movement patterns of an active recognizable device. The computer readable instructions 520 may therefore also comprise instructions to apply a pre-trained ML model on acquired data. Use of ML in similar contexts are e.g. exemplified in https://spectrum.ieee.org/tech-talk/telecom/wireless/smartphones-will-get-even-smarter-with-ondevice-machine-learning.

According to another aspect, a computer program product 525, is suggested. The computer program product 525, comprises a computer program, i.e. computer readable instructions, which when executed by a computer, here processing circuitry of the UAV 500a, the computer is caused, or configured to, execute a method according to any of the embodiments described above with reference to FIGS. 3a and 3b. The computer program product 525 is configured in the form of a part of memory 515, or a separate memory (not shown), which may be Read-and-Write (RWM) and Read-only-Memory (ROM). The memory, also typically comprise persistent storage, which may be any single one or combination of a magnetic memory, a solid state memory, or even a remote mounted memory. The computer program product 525 may be provided in the form of e.g. an optical disc, such as a Compact Disc (CD) or a Digital Versatile Disc (DVD) or a Blu-Ray disc.

Figure 5B:
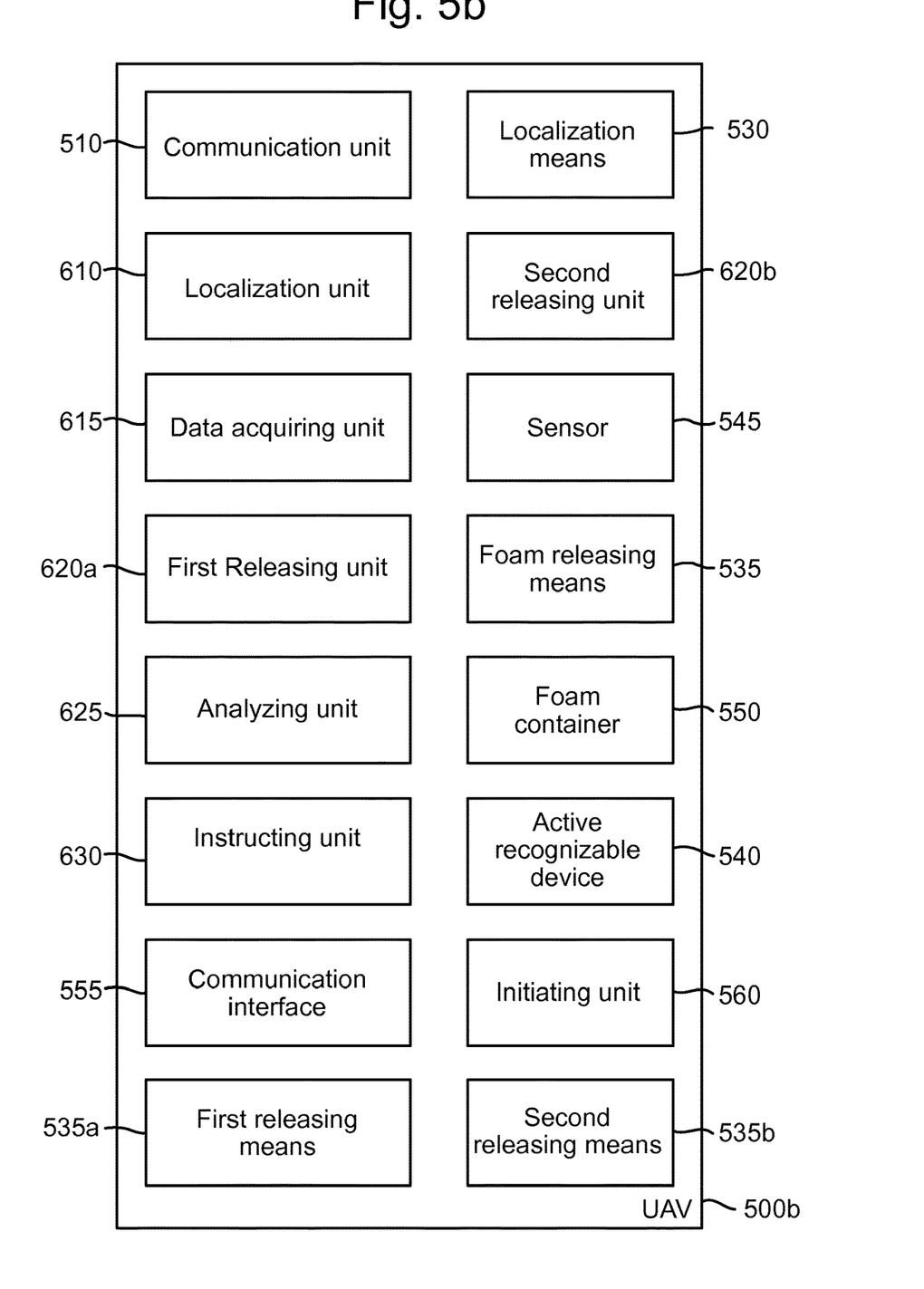
FIG. 5b is another block scheme, illustrating a UAV according to another embodiment.

According to another aspect, a UAV 500b can be configured according to FIG. 5b, where functionality is provided in the form of various functional units, or modules, each of which can be implemented in software, i.e. as computer readable instructions, stored in a suitable storage, as already mentioned above, in hardware, configured as adapted processing circuitry, such as e.g. ASICS (Application Specific Integrated Circuitry) or as a combination of both. In addition, the UAV 500b comprises hardware, as already described above, with reference to FIG. 5a.

UAV 500b comprises a localization unit 610 for initiating a first localization of at least one body or object, based on captured data, captured by one or more localization means 530, according to step 300 of FIG. 3a, an analysing unit 625, for initiating an analysis, for determining a need of activities, at least partly based on the localization of the at least one body or object, according to step 305 of FIG. 3a, and an initiating unit 560, for initiating the determined activities, according to step 310 of FIG. 3a. The mentioned initiating of activities will comprise at least applying, floatable foam to an area on or in close proximity to at least one body or object, by activating a first releasing unit 620a, while applying, recognizable means, capable of assisting in a second localization of the at least one body or object, to the floatable foam, by activating a second releasing unit 620b. The second releasing unit 620b may be configured to release, or apply, passive or active, recognizable means, as already described above. In addition, the initiating unit 560 is configured to activate an active, recognizable device 540, in case active, recognizable means are applied. UAV 500b also comprises a data acquiring unit 615 and an instructing unit 630. UAV 500b may set up a radio communication with a radio communication network via communication unit 510 by applying a known radio communication protocol, and may also set up a communication, typically a known short range communication, with an active, recognizable device, by applying a suitable short range communication protocol, via communication unit 510 or a separate communication unit (not shown). In case a dialogue can be set up between the UAV 500b and a person in distress, e.g. by presenting visual text or audible instructions, or a combination of both, such a dialogue may be executed via a suitable communication interface, which can be configured according to well known procedures.

The invention claimed is:

1. A method at an Unmanned Aerial Vehicle (UAV) for assisting in a rescue mission, the method comprising:
    initiating a first localization of at least one body or object;
    initiating an analysis, for determining, at least partly based on the first localization of the at least one body or object, a need for activities; and
    initiating the activities based on the determined need for the activities, comprising applying an adhesive floatable foam to an area on or in close proximity to the at least one body or object, while embedding, into the adhesive floatable foam, an active recognizable device capable of assisting in a second localization of the at least one body or object.

2. The method according to claim 1, wherein the determination is at least partly based on at least one of: data captured by a camera, and sound captured by a microphone.

3. The method according to claim 1, wherein the determination comprises:
    collecting data from the context of the at least one body or object;
    evaluating the collected data, and
    determining, based on the evaluation, that the adhesive floatable foam and the active recognizable device are needed for the at least one body or object.

4. The method according to claim 1, wherein the determination is a determination that adhesive floatable foam and the active recognizable device are needed for a group of bodies and/or objects.

5. The method according to claim 1, wherein the determination further comprises:
    determining, for each specific body, object or group of bodies and/or objects a suitable amount and a suitable form of the adhesive floatable foam.

6. The method according to claim 5, wherein the suitable amount and the suitable form of floatable foam are determined based on acquired data, where the acquired data is indicating at least one of:
    an identity or category of the at least one body or object;
    a geographical distribution of a plurality of bodies and/or objects, together forming a group of bodies and/or objects;
    a movement pattern of the at least one body or object; and
    meteorological data, indicative of a meteorological status of an area circumventing the at least one body or object.

7. The method according to claim 1, wherein the activities include activating the active recognizable device.

8. The method according to claim 7, wherein the activation of the active recognizable device comprises activation of functionality, comprising at least one of:
    stroboscopic functionality;
    LED functionality;
    radio communication functionality; and
    transponder functionality.

9. The method according to claim 8 further comprising:
    initiating acquiring of additional data, for a purpose of determining at least one of:
        a unique identity or category of a specific body or object or group of bodies and/or objects, for which the activities have been initiated;
        a physical status of a specific body or group of bodies, for which the activities have been initiated;

a number of bodies and/or objects within a group of bodies and/or objects, for which the activities have been initiated;

a floatable geographical location, where the activities have been initiated for the at least one body and/or object;

a time and date when the activities have been initiated; and a meteorological status when the activities have been initiated.

10. The method according to claim 9 further comprising: initiating transmission of the additional data from the active recognizable device to the UAV.

11. The method according to claim 9 further comprising: initiating storage of the additional data by the UAV.

12. The method according to claim 9 further comprising: navigating the UAV towards a location where the UAV experiences a radio connectivity; and providing at least part of the additional data via the radio connectivity.

13. The method according to claim 9, wherein at least part of the additional data is being analyzed by applying Machine Learning.

14. A computer program comprising computer readable instructions, which when run on a computer causes the computer to execute a method according to claim 1.

15. A computer program product comprising a computer program according to claim 14.

16. An Unmanned Aerial Vehicle (UAV) for assisting in a rescue mission, the UAV comprising processing circuitry and a memory, storing instructions which, when executed by the processing circuitry cause the UAV to perform operations comprising:

initiating a first localization of at least one body or object;

initiating an analysis, for determining, at least partly based on the localization of the at least one body or object, a need for activities; and initiating the activities based on the determined need for the activities, comprising applying an adhesive floatable foam to an area on or in close proximity of the at least one body or object, while embedding, into the adhesive floatable foam, an active recognizable device, capable of assisting in a second localization of the at least one body or object.

17. The UAV according to claim 16, wherein the operations further comprise causing the UAV to initiate the determination at least partly based on at least one of: data captured by a camera, and sound captured by a microphone.

18. The UAV according to claim 16, wherein the operations further comprise causing the UAV to execute the determination by:

collecting data from the context of the at least one body or object;

evaluating the collected data; and determining, based on the evaluation, that the adhesive floatable foam and the active recognizable device are needed for the at least one body or object.

19. The UAV according to claim 16, wherein the operations further comprise causing the UAV to determine that the adhesive floatable foam and the active recognizable device are needed for a group of bodies and/or objects.

20. The UAV according to claim 19, wherein the operations further comprise causing the UAV to determine, for each specific group of bodies and/or objects, a suitable amount and a suitable form of the adhesive floatable foam.

21. The UAV according to claim 20, wherein the operations further comprise causing the UAV to determine the suitable amount and the suitable form of the adhesive floatable foam, based on acquired data, where the acquired data is indicating at least one of:

an identity or category of the at least one body or object;

a geographical distribution of a plurality of bodies and/or objects;

together forming a group of bodies and/or objects;

a movement pattern of the at least one body or object; and meteorological data, indicative of a meteorological status of an area circumventing the at least one body or object.

22. The UAV according to claim 16, wherein the operations further comprise causing the UAV to initiate the activities, including activation of the active recognizable device.

23. The UAV according to claim 22, wherein the operations further comprise causing the UAV to activate functionality of the active recognizable device, wherein the active functionality comprises at least one of:

stroboscopic functionality;

LED functionality;

radio communication functionality; and transponder functionality.

24. The UAV according to claim 16, wherein the operations further comprise causing the UAV to initiate acquiring of additional data, for a purpose of determining at least one of:

a unique identity or category of a specific body or object or group of bodies and/or objects, for which the activities have been initiated;

a physical status of the specific body or group of bodies, for which the activities have been initiated;

a number of bodies and/or objects within a group of bodies and/or objects, for which the activities have been initiated;

a geographical location where the activities have been initiated;

time and date when the activities have been initiated; and a meteorological status when the activities have been initiated.

25. The UAV according to claim 24, wherein the operations further comprise causing the UAV to initiate transmission of at least some of the additional data from the active recognizable device to the UAV.

26. The UAV according to claim 24, wherein the operations further comprise causing the UAV to initiate storage of the additional data.

27. The UAV according to claim 24, wherein the operations further comprise causing the UAV to:

navigate the UAV towards a location where the UAV is experiencing a radio connectivity; and providing at least part of the additional data via the radio connectivity.

28. The UAV according to claim 24, wherein the operations further comprise causing the UAV to analyze at least part of the additional data by applying Machine Learning.

29. An Unmanned Aerial Vehicle (UAV) for assisting in a rescue mission, the UAV comprising:

a localization unit for initiating a first localization of at least one body or object;

an analyzing unit for initiating an analysis, for determining a need for activities, at least partly based on the first localization of the at least one body or object, and an initiating unit for initiating the activities based on the determined need for the activities, comprising applying, by a first releasing unit, an adhesive floatable foam to an area on or in close proximity to the at least one body or object, while embedding, into the adhesive floatable foam, by a second releasing unit, an active recognizable device, capable of assisting in a second localization of the at least one body or object.

30. A system comprising:

an Unmanned Aerial Vehicle (UAV);

an adhesive floatable foam;

an active recognizable device;

a capturing unit for initiating a first localization of at least one body or object;

an analyzing unit for initiating an analysis, for determining a need for activities, at least partly based on the first localization of the at least one body or object; and an initiating unit for initiating the activities based on the determined need for the activities, comprising applying, via a first releasing unit, the adhesive floatable foam to an area on or in close proximity of the at least one body or object, while embedding, via a second releasing unit, into the adhesive floatable foam, the active recognizable device, capable of assisting in a second localization of the at least one body or object.

* * * * *